(12) United States Patent
Gupta et al.

(10) Patent No.: US 10,740,322 B2
(45) Date of Patent: Aug. 11, 2020

(54) COLLAPSING MULTIPLE CHANGES IN A DATABASE FOR GENERATING A REDUCED NUMBER OF MESSAGES FOR AN EXTERNAL SYSTEM

(71) Applicant: salesforce.com, inc., San Francisco, CA (US)

(72) Inventors: Anjani Gupta, Redwood City, CA (US); William Victor Gray, Kitchener (CA); Shaahin Mehdinezhad Rushan, Dublin, CA (US); Yogesh Patel, Dublin, CA (US); Shreedhar Sundaram, San Mateo, CA (US); Mahalaxmi Sanathkumar, San Francisco, CA (US); William Hackett, Vallejo, CA (US); Rajkumar Pellakuru, San Jose, CA (US); Kshama Thacker, San Mateo, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 140 days.

(21) Appl. No.: 15/836,669

(22) Filed: Dec. 8, 2017

(65) Prior Publication Data

US 2019/0179931 A1     Jun. 13, 2019

(51) Int. Cl.
*G06F 16/23*     (2019.01)

(52) U.S. Cl.
CPC ...... *G06F 16/2358* (2019.01); *G06F 16/2365* (2019.01)

(58) Field of Classification Search
CPC . G06F 16/2358; G06F 16/2365; G06F 16/235
See application file for complete search history.

(56) References Cited

U.S. PATENT DOCUMENTS

| | | | |
|---|---|---|---|
| 7,730,478 B2 | 6/2010 | Weissman | |
| 9,058,367 B2* | 6/2015 | Kamireddy | ........... G06F 16/215 |
| 9,866,591 B1* | 1/2018 | Statica | ................... H04L 63/20 |
| 10,282,352 B2 | 5/2019 | Gray | |
| 10,360,626 B2* | 7/2019 | Ravisankar | ............ G06Q 40/00 |
| 10,455,264 B2 | 10/2019 | Patel et al. | |
| 2005/0276394 A1* | 12/2005 | Rossi | ...................... H04M 3/22 |
| | | | 379/88.17 |
| 2006/0117040 A1* | 6/2006 | Begeja | .................. G06F 16/735 |

(Continued)

*Primary Examiner* — Giovanna B Colan
(74) *Attorney, Agent, or Firm* — NDWE LLP

(57) ABSTRACT

A method is described for collapsing a plurality of detected changes to data in a database into a reduced set of changes. The method includes detecting a plurality of changes to the database; determining that one or more changes in the plurality of changes are superfluous to demonstrating the current state of data in the database to an external system; determining, in response to determining that one or more changes in the plurality of changes are superfluous, a reduced set of changes that demonstrates the current state of data in the database based on the plurality of changes, wherein a number of changes in the plurality of changes is greater than a number of changes in the reduced set of changes; and determining a set of messages to generate based on the reduced set of changes, wherein the set of messages demonstrate the current state of data.

16 Claims, 15 Drawing Sheets

(56) References Cited

U.S. PATENT DOCUMENTS

| | | | |
|---|---|---|---|
| 2012/0109893 A1* | 5/2012 | Bryson | G06F 16/2358 |
| | | | 707/634 |
| 2015/0066992 A1* | 3/2015 | Tomarkin | G06Q 30/0631 |
| | | | 707/803 |
| 2015/0142530 A1 | 5/2015 | Motamedi et al. | |
| 2015/0169733 A1 | 6/2015 | Motamedi et al. | |
| 2017/0046379 A1 | 2/2017 | Thacker et al. | |
| 2017/0081685 A1 | 3/2017 | Gilson et al. | |
| 2017/0322965 A1 | 11/2017 | Gray | |
| 2018/0150478 A1* | 5/2018 | Wang | G06F 16/185 |
| 2019/0147404 A1 | 5/2019 | Lue et al. | |
| 2019/0163791 A1 | 5/2019 | Sanathkumar et al. | |
| 2019/0179673 A1 | 6/2019 | Gray et al. | |
| 2019/0179931 A1 | 6/2019 | Gupta et al. | |
| 2019/0213552 A1 | 7/2019 | Gupta et al. | |
| 2019/0238604 A1 | 8/2019 | Sundaram et al. | |
| 2019/0238605 A1 | 8/2019 | Patel et al. | |
| 2019/0238918 A1 | 8/2019 | Patel et al. | |
| 2019/0370080 A1 | 12/2019 | Patel et al. | |
| 2019/0373031 A1 | 12/2019 | Patel et al. | |
| 2020/0034473 A1 | 1/2020 | Rushan et al. | |
| 2020/0099771 A1 | 3/2020 | Hsu et al. | |

\* cited by examiner

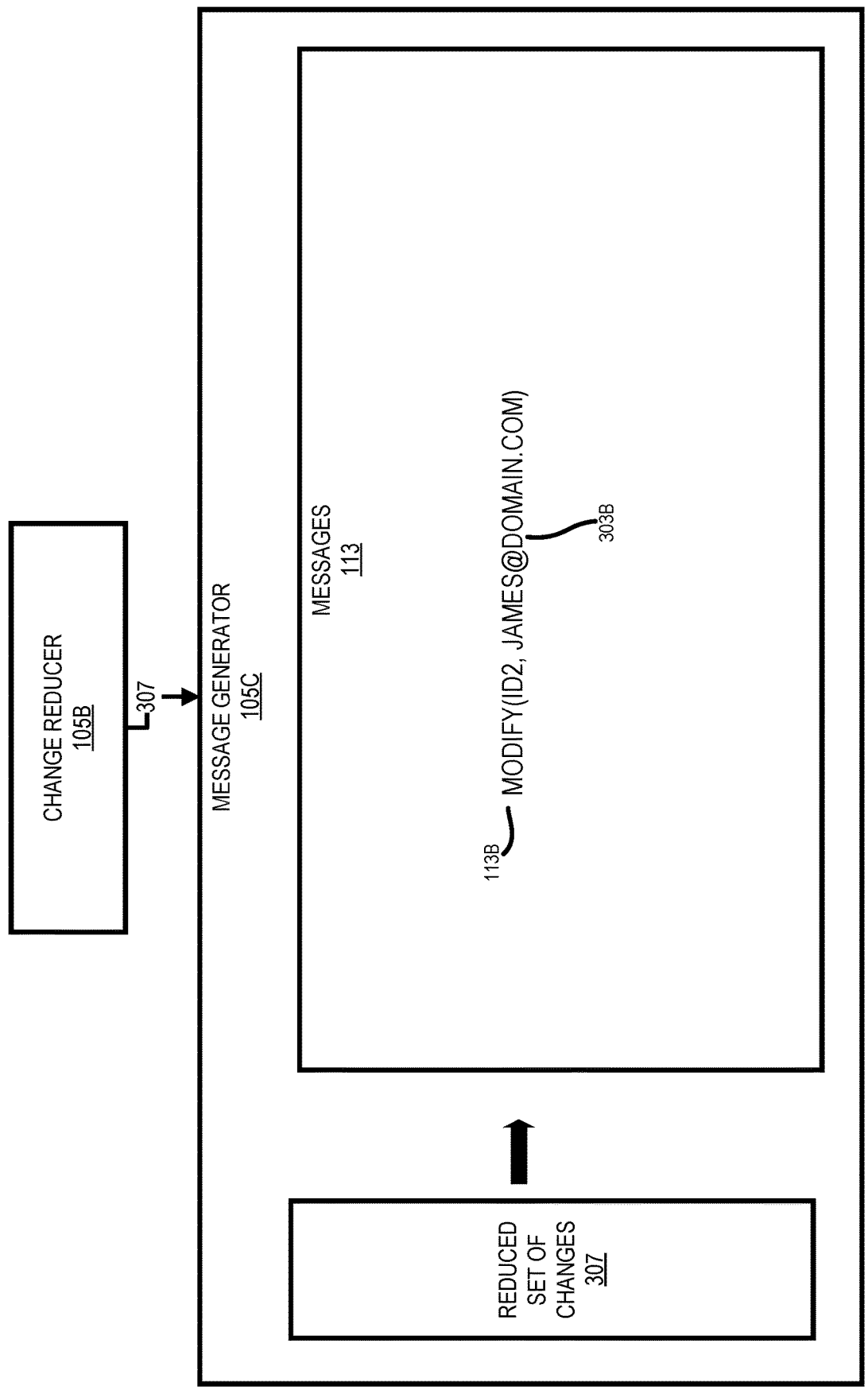

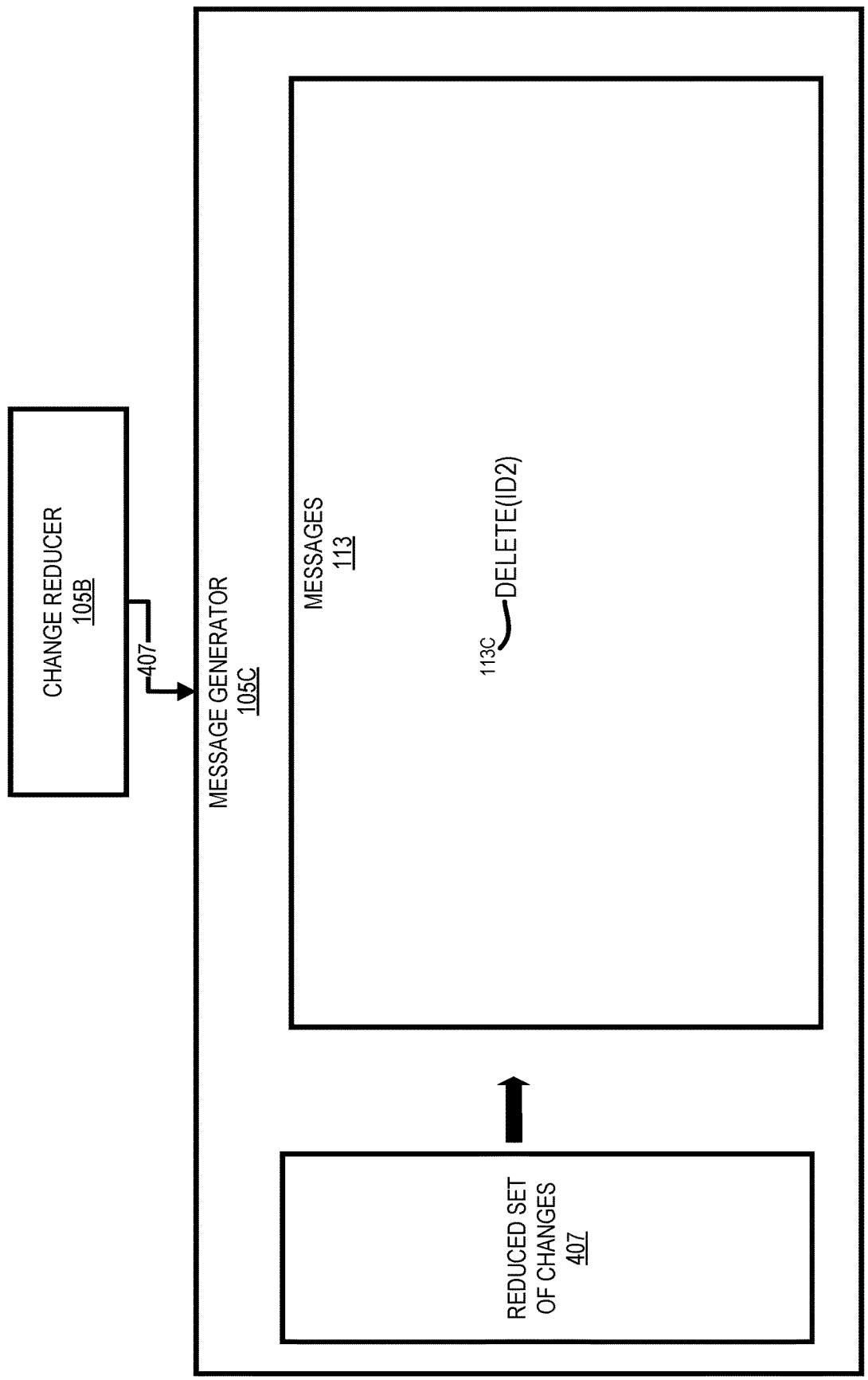

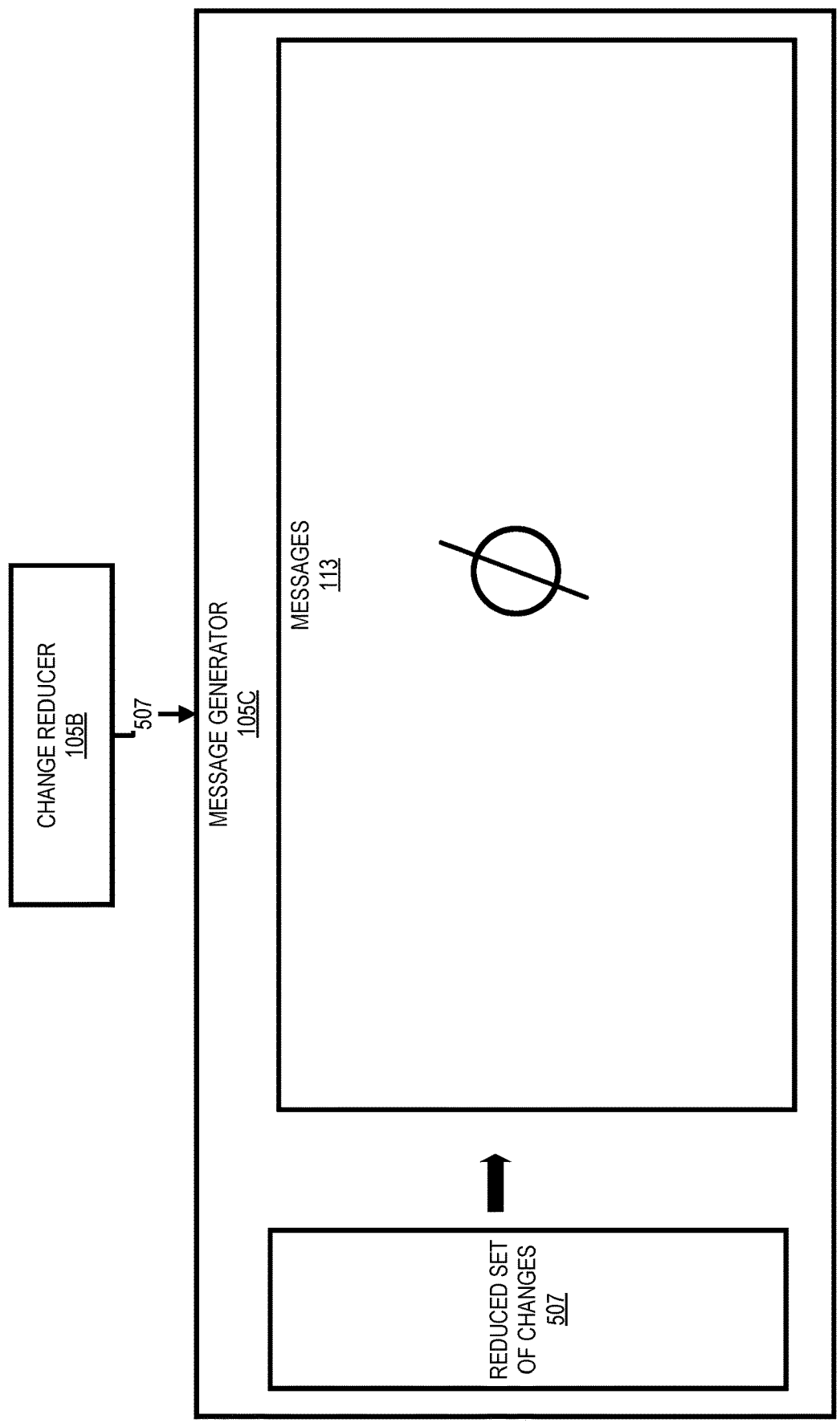

COLLAPSING MULTIPLE CHANGES IN A DATABASE FOR GENERATING A REDUCED NUMBER OF MESSAGES FOR AN EXTERNAL SYSTEM

TECHNICAL FIELD

One or more implementations relate to the field of database management; and more specifically, to collapsing changes for generating a reduced number of messages while still demonstrating a current state of data in the database to an external system.

BACKGROUND

A database may store records representing multiple different types of objects. For example, a customer relationship management (CRM) database of a CRM system may store records representing event objects, task objects, account objects, contact objects, etc. Services may change data within the database and these changes may include modifying, creating, or deleting records. For example, when a user creates a meeting through a CRM service of the CRM system, a record corresponding to an event object is created in the corresponding CRM database. To create this record, the CRM service sends a request to the CRM database to cause the creation of the record.

Records in a database may be used by external systems for various functions. For example, an external system may generate metrics at least partially based on records within a CRM database. To facilitate the generation of metrics based on records within the CRM database, a transaction observer of the CRM system may monitor all changes to the CRM database and generate a message for each of these changes. The messages may thereafter be made available, via an enterprise messaging platform and a streamer, to the external system such that external system can update their metrics based on a current state of data in the CRM database. Since the transaction observer of the CRM system is not collocated with the external system, each message must be transported over a network. As there may be thousands or millions of changes to the CRM database each day and thus an equally large number of messages representing these changes, the bandwidth occupied by messages reflecting changes to the CRM database may be very large and burdensome. Further, the external system may update the metrics based on each individual message. After each update, the metrics may be made available and eventually transported to consumers, including the CRM system. Thus, the processing power devoted by the external system to messages reflecting changes to the CRM database and bandwidth devoted to transporting the updated metrics may be equally large and burdensome.

Although the description above was presented in relation to CRM systems, similar problems are encountered by all databases that demonstrate a current state of data to external systems using messages that reflect changes to the databases.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 3C shows a set of messages generated based on the reduced set of changes of FIG. 3B according to one example implementation.

FIG. 4C shows a set of messages generated based on the reduced set of changes of FIG. 4B according to one example implementation.

FIG. 5C shows a set of messages generated based on the reduced set of changes of FIG. 5B according to one example implementation.

DETAILED DESCRIPTION

Figure 1:
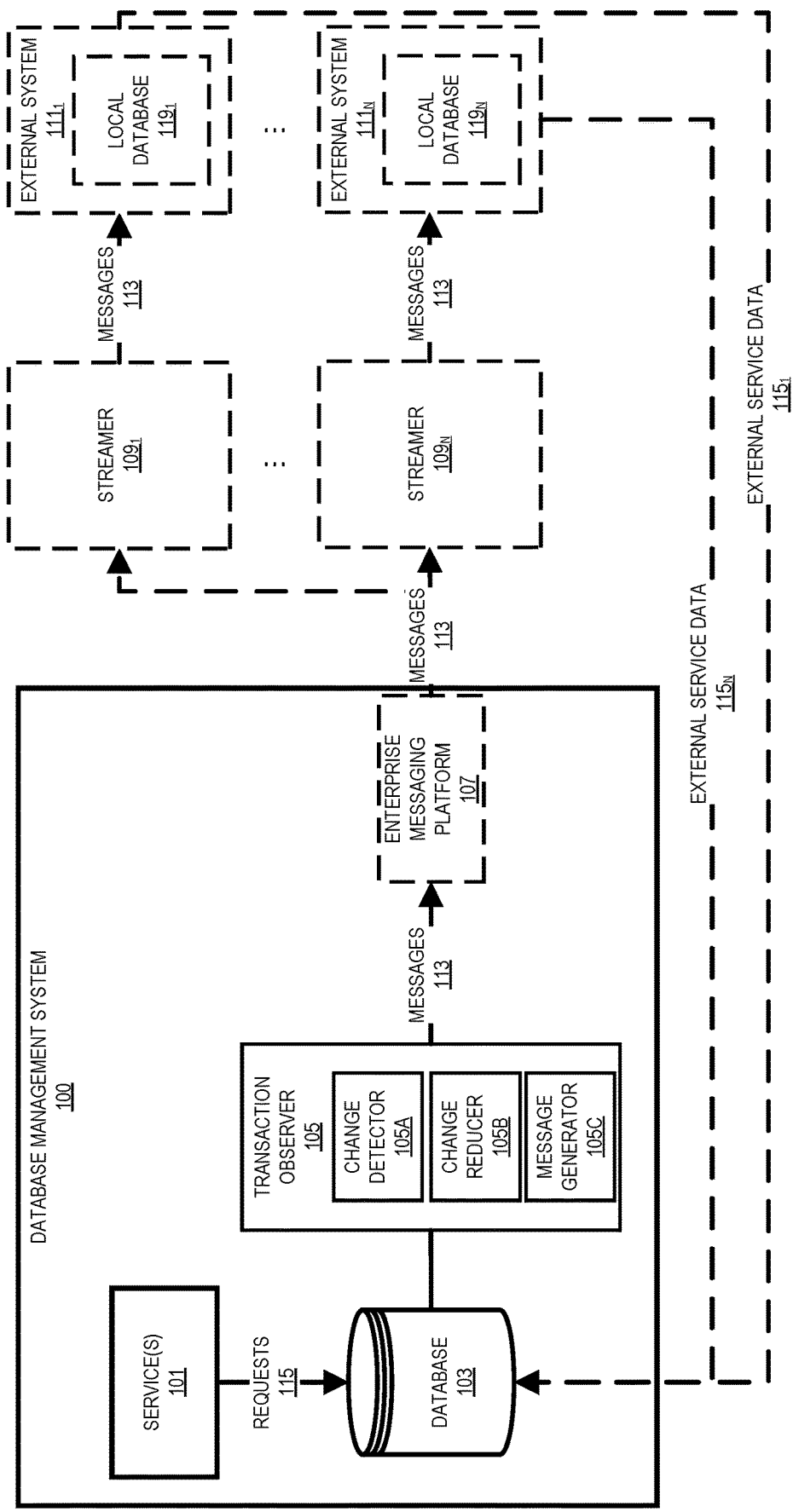
FIG. 1 shows a database management system according to one example implementation.

FIG. 1 shows a database management system 100 according to one example implementation. As shown in FIG. 1, the database management system 100 may include one or more services 101 that operate with a database 103. In one implementation, the one or more services 101 are customer relationship management (CRM) services that are used for managing a company's relationships and interactions with current customers and potential customers (e.g., Sales Cloud by salesforce.com, Inc.). For example, the services 101 may provide functionality (e.g., a graphical user interface (GUI)) to allow a user to (1) enter information describing a new account (e.g., a name of the account), a new contact for the account (e.g., name of the contact, an email address of the contact, etc.), or a new event associated with the contact (e.g., an identifier of the contact participating in a meeting, a meeting start time, a meeting end time, a location of the meeting, etc.); (2) enter information to modify an existing account, contact, or event; and (3) enter information to delete an existing account, contact, or event.

In response to entering information via the services 101, the services 101 may transmit one or more requests 115 to the database 103. Each request 115 may include one or more operations to effectuate corresponding changes to data in the database 103 (e.g., one or more create record operations, one or more modify record operations, and/or one or more delete record operations). One or more operations may be committed together such that the changes to the database 103 are made permanent. Operations or changes committed to the database 103 together may be known as a transaction.

In one implementation, the database 103 comprises one or more database objects that each include a number of records. The term "record" generally refers to a data entity created by or on behalf of a user of the services 101. A record is comprised of a set of fields defined within the database 103. The database 103 can be viewed as a collection of database objects, such as a set of logical tables, containing data fitted into predefined categories. A "table" is one representation of a database object, and may be used herein to simplify the conceptual description of database objects. In the context of a relational database, each relational database table generally contains one or more data categories logically arranged as columns according to a schema, where the columns of the relational database table are different ones of the fields from the plurality of records, and where each row of the relational database table are different ones of a plurality records and contains an instance of data for each category defined by the fields. In some implementations of a cloud database (a database that runs on a cloud platform and access to which is provided as a database service), each database object contains a plurality of records having fields, where identifiers are used instead of database keys, and wherein relationships are used instead of foreign keys. Regardless, by way of example, a record can be for a business partner or potential business partner of a user, and can include information describing an entire account of a business partner or potential business partner and/or contacts for the account. As another example, a record can be for a project that a user is working on, such as an opportunity (e.g., a possible sale) or an event (e.g., a meeting) with an existing partner, or a project that the user is trying to get.

In one implementation, the database management system 100 may include a transaction observer 105 that monitors the database 103 for changes. For example, the transaction observer 105 may monitor the database 103 to detect one or more of creation of a record in the database 103, the deletion of a record from the database 103, and the modification of a field of a record in the database 103 (e.g., modification of a field of a record to a new value). Although described as the transaction observer 105 detecting changes for any piece of data in the database 103, in some implementations, the transaction observer 105 may restrict detecting changes to only specific pieces of data in the database 103. For example, the transaction observer 105 may only detect changes corresponding to specific records or specific fields of records in the database 103 (e.g., an email address field).

In response to detecting a change to the database 103, the transaction observer 105 may generate a message 113 that reflects the change to the database 103. In one implementation, each message 113 may include an identifier of the record that was changed (e.g., created, deleted, or modified), one or more other pieces of data from the database 103 (e.g., a field value for the record), and an action. For example, in response to detecting that a field of a record in the database 103 has been modified to a new value, the transaction observer 105 may generate a message that includes "modify (record_identifier, new_value)", where "modify" indicates the action of a field value being modified, "record_identifier" indicates the record in the database 103 that is being modified, and "new_value" indicates the field value that the field of the record is being modified to. As will be described in greater detail below, in one implementation, one or more external systems $111_{1-N}$ may each keep a local database $119_{1-N}$ reflecting data in the database 103 and the messages 113 allow the external systems $111_{1-N}$ to update the local databases $119_{1-N}$ based on the current state of data in the database 103. In some implementations, the local databases $119_{1-N}$ may each include a subset of the data in the database 103 (e.g., a subset of fields and/or records in the database 103). For example, a local database $119_1$, may include an identifier field for records in the database 103 and an email address field for records in the database 103. Otherwise this local database $119_1$ may be populated with other fields that are not present in the database 103.

Following generation, messages 113 may be provided to the enterprise messaging platform 107. The enterprise messaging platform 107 may make the messages 113 available for consumption by one or more subscribers. For example, the transaction observer 105 may push the messages 113 to the enterprise messaging platform 107 and the enterprise messaging platform 107 may broadcast the messages 113 to subscribing external systems $111_{1-N}$ via corresponding streamers $109_{1-N}$. In this implementation, each external system 111 is associated with a corresponding streamer 109, which receives messages 113 from the enterprise messaging platform 107 and pushes the messages 113 to a corresponding external system 111. In some implementations, one or more of the enterprise messaging platform 107 and the streamers 109 may ensure that the messages 113 are in a format expected by the external systems 111 and/or modify or transform the message 113 to be in a format expected by the external system 111. In some implementations, one or more of the streamers $109_{1-N}$ and the external systems $111_{1-N}$ may be located on separate networks from the database 103, the transaction observer 105, and the enterprise messaging platform 107. Accordingly, in these implementations, the messages 113 are communicated via corresponding network infrastructure (e.g., routers, switches, etc.) to the external systems $111_{1-N}$ via the streamers $109_{1-N}$.

Providing the messages 113, which reflect changes to the database 103, to the external systems $111_{1-N}$ allows the external systems 111 to understand a current state of data in the database 103. In particular, the messages 113 demonstrate the current state of data in the database 103 such that the external systems 111 may each maintain a local database 119. In some implementations, an external system 111 may generate external system data 115 based on their local database 119. Since the messages 113 allow the external systems 111 to maintain their local database 119 based on the current state of the data in database 103, the external system data 115 may be generated based on the current state of the data in the database 103. For example, an external system 111 may maintain a set of metrics based on the current state of data in the database 103 (e.g., how many events are associated with a particular email address). Since the transaction observer 105 identifies changes to the database 103 as they occur and generates messages 113 reflecting these changes that are made available to the externals systems $111_{1-N}$ and are used to update corresponding local databases $119_{1-N}$, the external system data $115_{1-N}$ generated by the external systems $111_{1-N}$ may be updated after receipt of each message 113 and accordingly will always be reflective of the current state of data in the database 103. In some implementations, this external system data 1151N generated by the external systems $111_{1-N}$ may be made available back to the database 103 after any update to the external system data $115_{1-N}$ such that the database 103 may store this external system data $115_{1-N}$ along with associated records. For example, when an external system 111 maintains metrics regarding how many events are associated with a particular email address, the metrics (i.e., external system data 115) may be made available by the external system 111 to the database 103 such that the database 103 may store these metrics with corresponding records associated with the respective email address.

In some situations, the transaction observer 105 may detect hundreds, thousands, or even millions of changes to the database 103 during a particular time period (e.g., one hour, one day, one week, etc.). In these situations, a large number of messages 113, equal to the number of detected changes, will be made available to the external systems $111_{1-N}$. This large number of messages 113 may be burdensome on network and processing resources. For example, since the streamers $109_{1-N}$ and/or the external systems $111_{1-N}$ may be located on a separate network from the database 103, the transaction observer 105, and the enterprise messaging platform 107, the messages 113 may occupy a considerable amount of network bandwidth. Further, since the external systems $111_{1-N}$ may communicate external system data $115_{1-N}$ back to the database 103 in response to each message 113, communication of the external system data $115_{1-N}$ generated by the external systems $111_{1-N}$ may also occupy a considerable amount of bandwidth. Moreover, as noted above, the external systems $111_{1-N}$ may generate data for each message 113 (e.g., update metrics related to a current state of data in the database 103). Accordingly, a large number of messages 113 will result in a corresponding large amount of processing resources (e.g., processor cycles) consumed for generating the external system data $115_{1-N}$ in response to each message 113.

To alleviate burdens caused by a large number of messages 113 (e.g., networking and processing burdens), the transaction observer 105 may collapse a plurality of detected changes on data in the database 103 into a reduced set of changes (where the number of changes in the plurality of detected changes is greater than the number of changes in the reduced set of changes). In one implementation, the transaction observer 105 may collapse the plurality of detected changes into a reduced set of changes in response to determining that one or more of the changes in the plurality of detected changes is superfluous to demonstrating a current state of the database 103 to the external systems $111_{1-N}$. In other words, the plurality of detected changes and the reduced set of changes may each demonstrate the current state of data in the database 103, but the reduced set of changes may demonstrate the current state of data in the database 103 with less number of changes. The transaction observer 105 may generate messages 113 for each change in the reduced set of changes instead of generating a message 113 for each change in the plurality of detected changes. Since there are less changes in the reduced set of changes in comparison the plurality of detected changes, the number of messages 113 generated based on the reduced set of changes will also be less that the number of messages 113 that would be generated based on the plurality of detected changes.

In one implementation, the transaction observer 105 may include a change detector 105A for detecting a plurality of changes to the database 103. A change reducer 105B of the transaction observer 105 may reduce the plurality of detected changes to a reduced set of changes when one or more changes of the plurality of detected changes is superfluous to demonstrating the current state of data in the database 103 to the external systems $111_{1-N}$. A message generator 105C of the transaction observer 105 may generate a message 113 for each of the reduced set of changes. These messages 113 generated for the reduced set of changes may be made available to the external systems $111_{1-N}$ via the enterprise messaging platform 107 and corresponding streamers $109_{1-N}$ as discussed above.

Figure 2A:
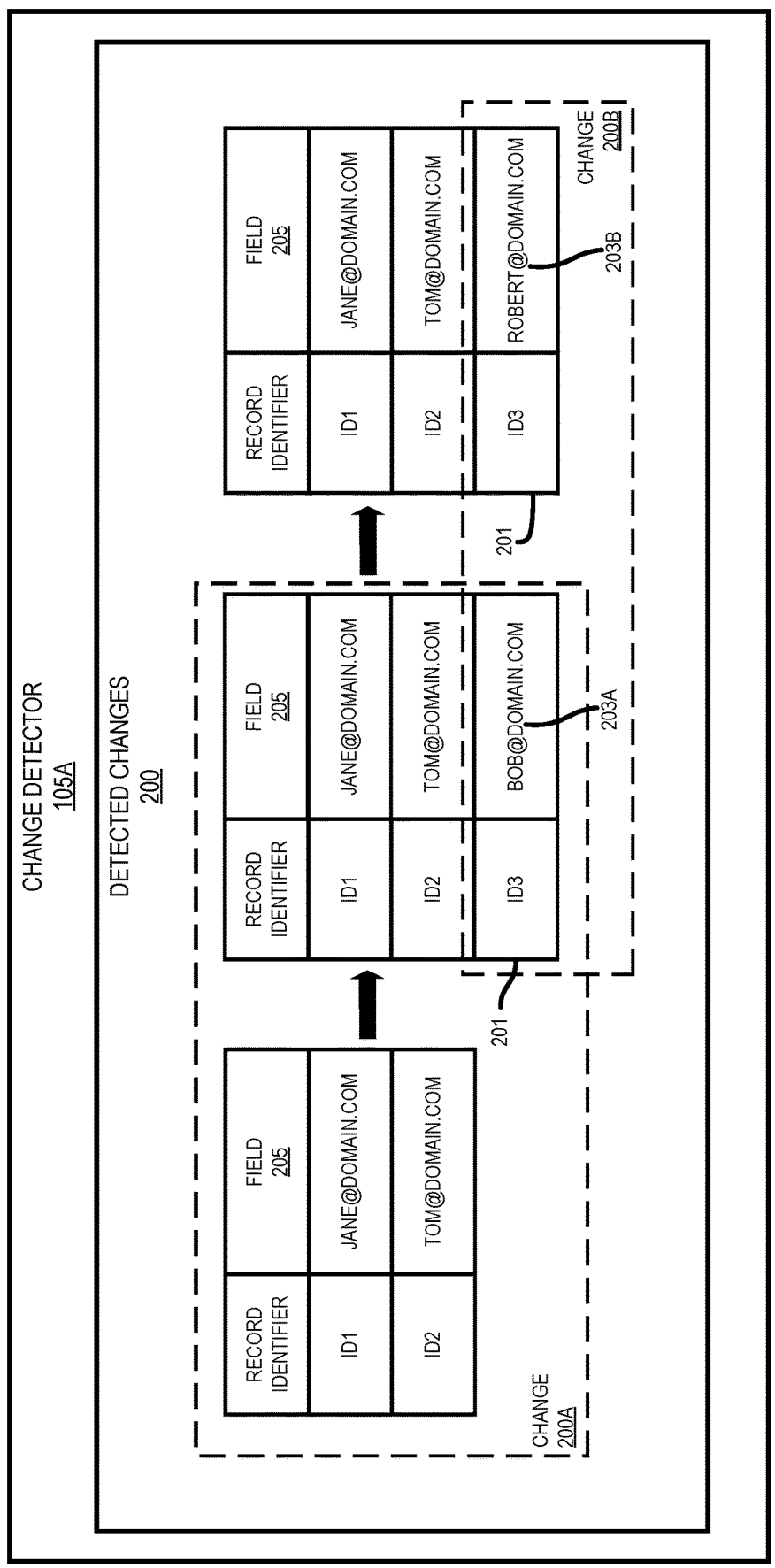
FIG. 2A shows a plurality of detected changes to a database according to one example implementation.
Figure 2B:
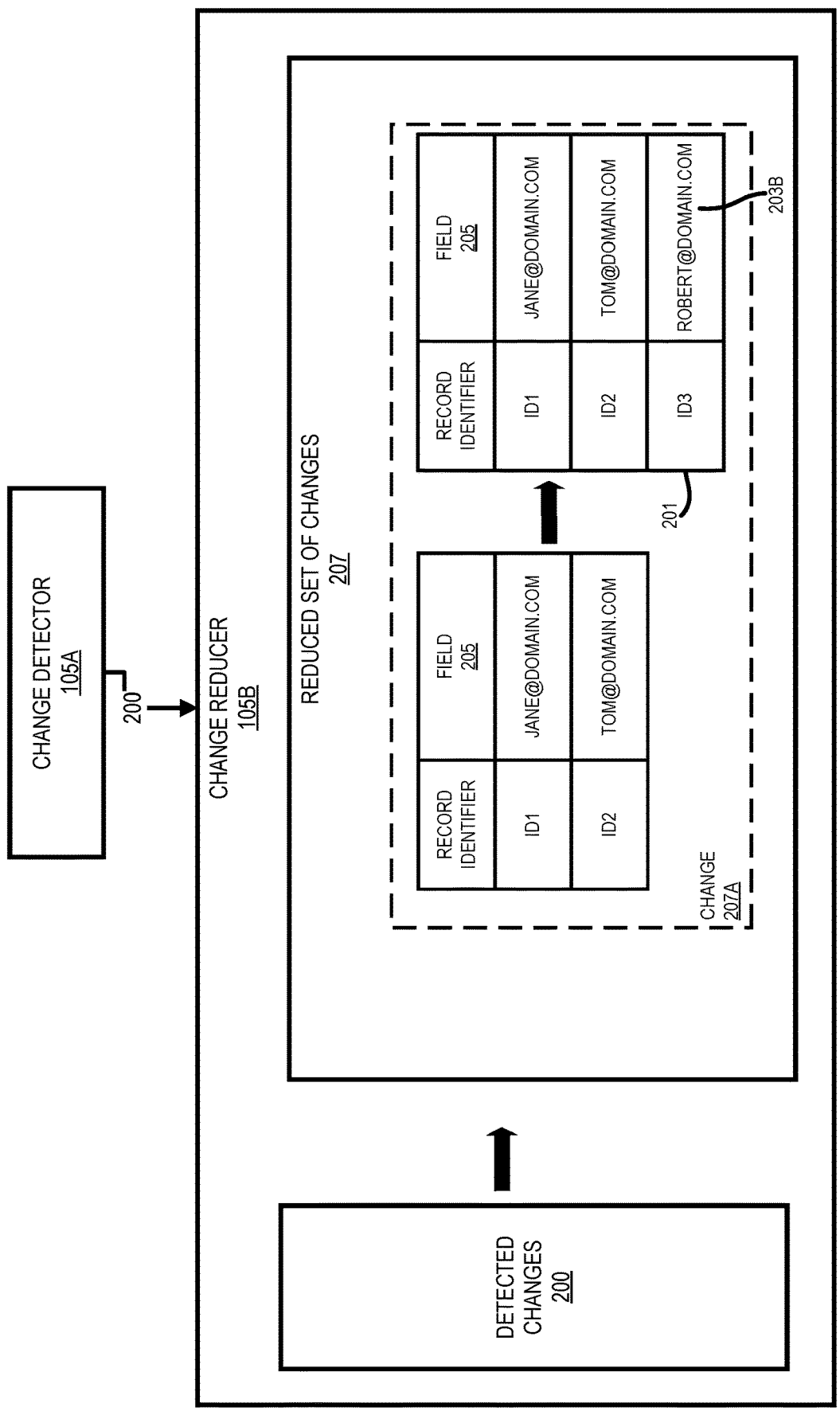
FIG. 2B shows a reduced set of changes based on the detected set of changes from FIG. 2A that demonstrate the current state of data in the database according to one example implementation.
Figure 2C:
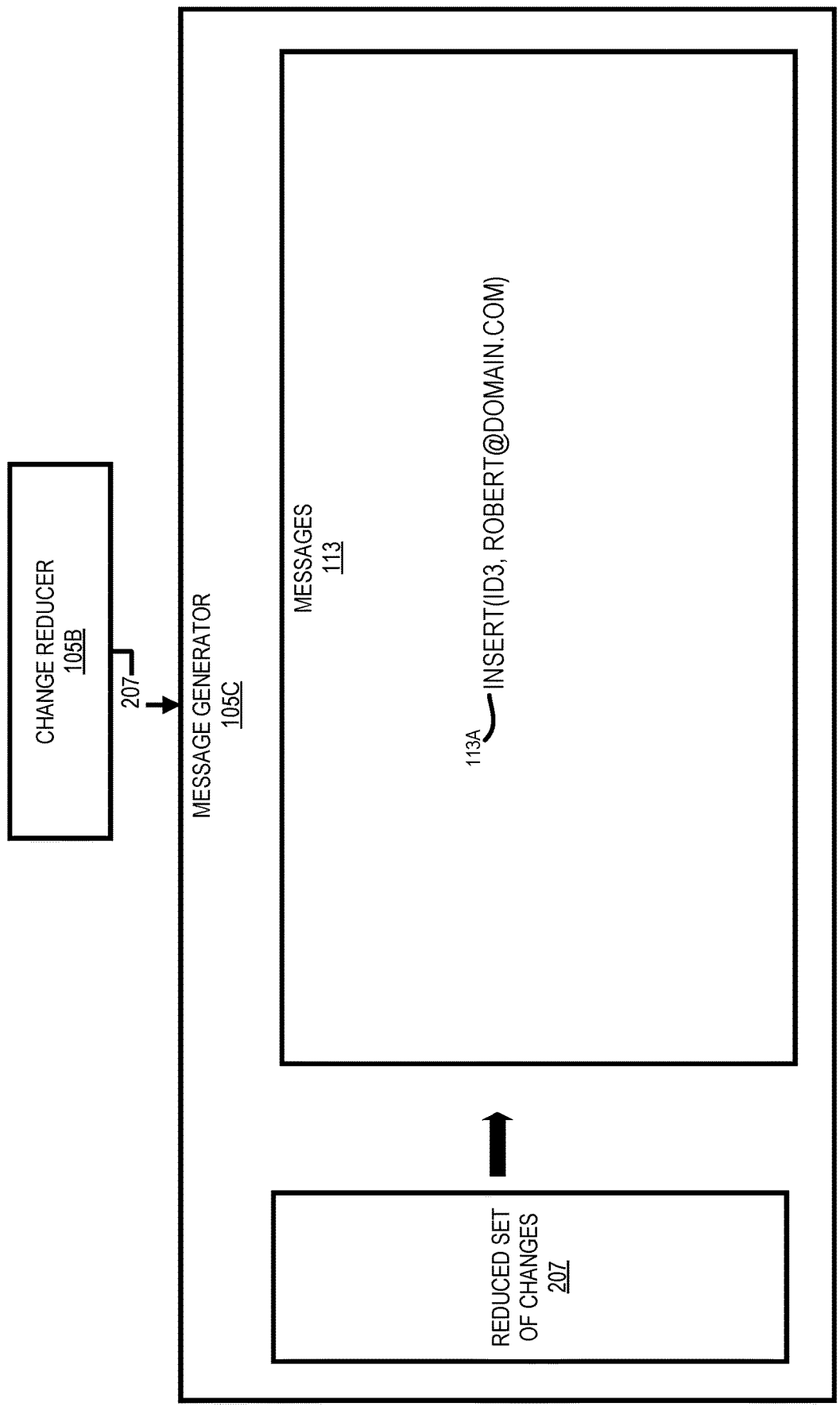
FIG. 2C shows a set of messages generated based on the reduced set of changes of FIG. 2B according to one example implementation.

The change reducer 105B may determine that one or more changes of the plurality of detected changes is superfluous to demonstrating the current state of data in the database 103 to the external systems $111_{1-N}$ under various scenarios. FIGS. 2A-2C show a scenario according to one example implementation. In particular, FIG. 2A shows a plurality of detected changes 200 to the database 103 that were detected by the change detector 105A according to one example implementation. As shown in FIG. 2A, the plurality of detected changes 200 may include a first change 200A that creates a record 201 with the record identifier ID3 in the database 103 and with a first value 203A (e.g., BOB@DOMAIN.COM) for a field 205 in the record 201 and a second change 200B in the plurality of detected changes 200 that modifies the field 205 to a second value 203B (e.g., ROBERT@DOMAIN.COM). In this scenario, as shown in FIG. 2B, the change reducer 105B may determine that a reduced set of changes 207 are sufficient to demonstrate the current state of data in the database 103 to the external systems $111_{1-N}$. In particular, as shown in FIG. 2B, the change reducer 105B may determine that the detected changes 200 may be collapsed to the reduced set of changes 207 that demonstrates the current state of data in the database 103. In this scenario, the reduced set of changes 207 includes only a single change 207A that creates the record 201 with the identifier ID3 and with the second value 203B for the field 205. As shown in FIG. 2C, the reduced set of changes 207 may thereafter be used for generating messages 113 that are made available to the external systems $111_{1-N}$. In this scenario, a single message 113A is generated by the message generator 105C. Although this message 113A is generated based solely on the change 207A, the message 113A reflects the current state of data in the database 103 based on the first change 200A and the second change 200B. This message 113A includes the identifier of the record 201 (i.e., ID3), the second value 203B, and the "insert" action that indicates that the record 201 with the identifier ID3 and with the second value 203B was inserted into the database 103. This message 113A may be used by one or more external systems $111_{1-N}$ for updating corresponding local databases $119_{1-N}$ and/or external system data $115_{1-N}$. Generating messages 113 using the reduced set of changes 207 produces a corresponding reduced set of messages 113 in comparison to using the plurality of detected changes 200 (e.g., one message 113 was generated instead of two messages 113).

Figure 3A:
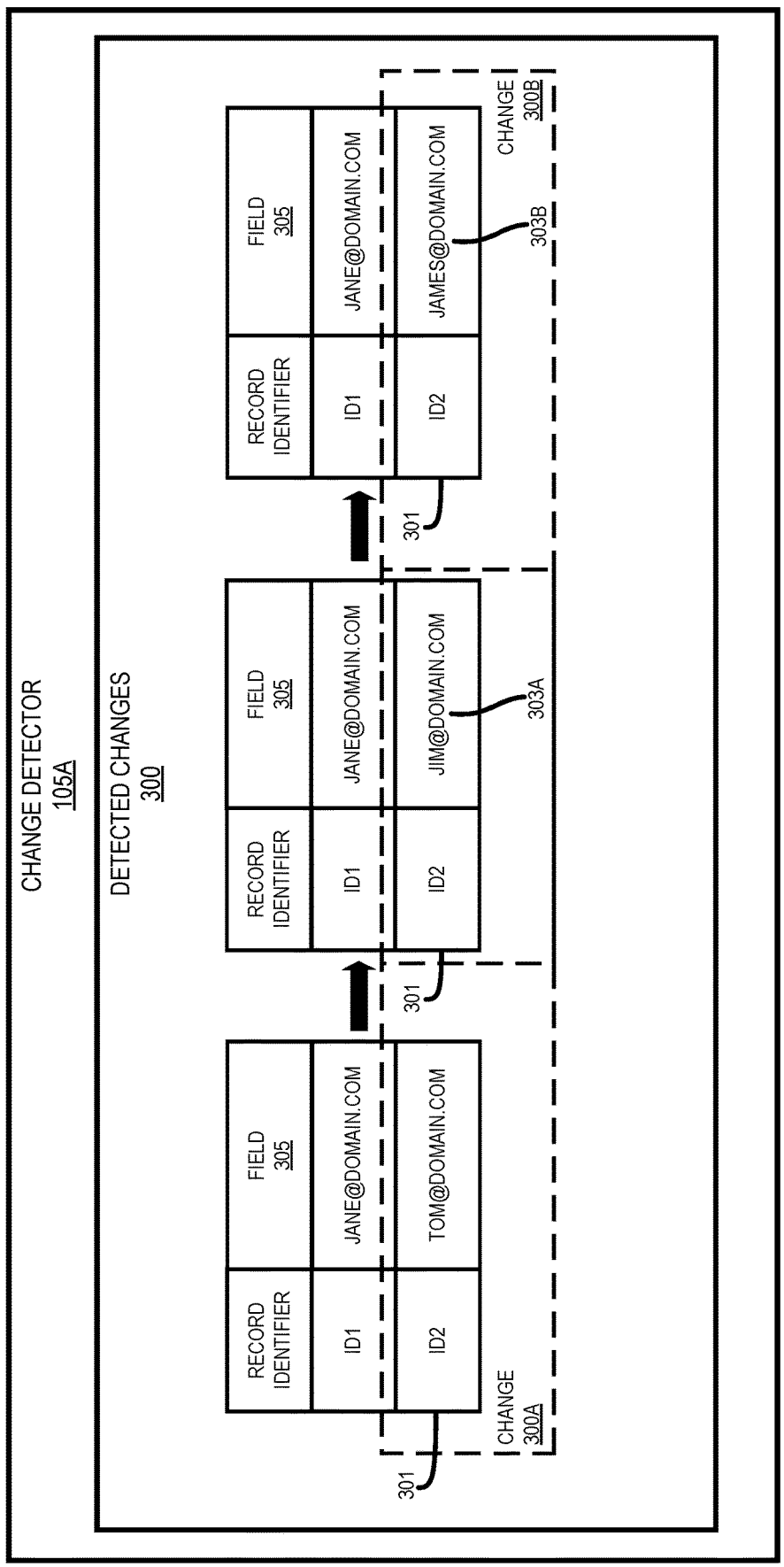
FIG. 3A shows a plurality of detected changes to a database according to one example implementation.
Figure 3B:
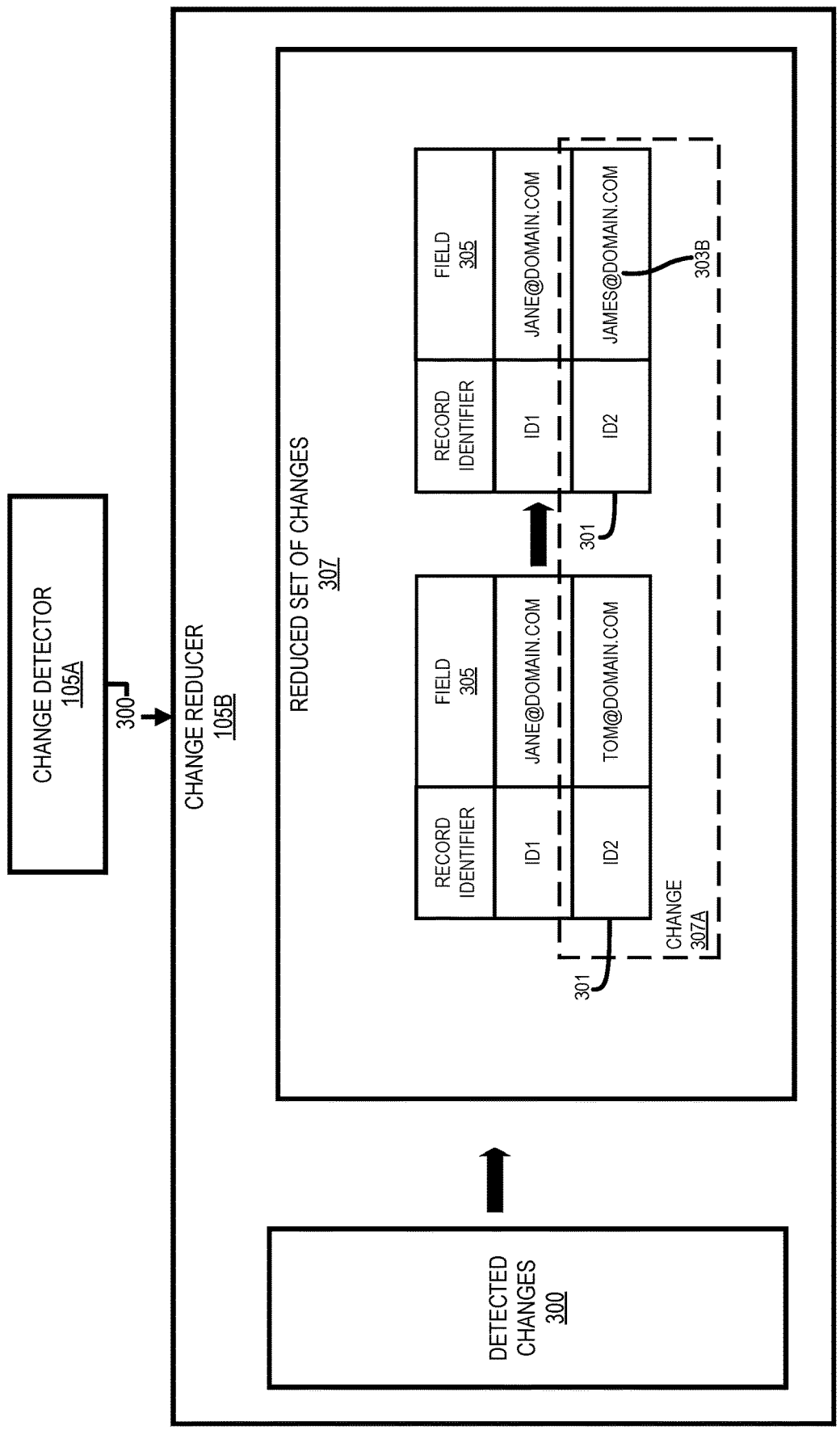
FIG. 3B shows a reduced set of changes based on the detected set of changes from FIG. 3A that demonstrate the current state of data in the database according to one example implementation.

FIGS. 3A-3C show another scenario in which the change reducer 105B may determine that one or more changes of a plurality of detected changes is superfluous to demonstrating the current state of data in the database 103 to the external systems $111_{1-N}$. In particular, FIG. 3A shows a plurality of detected changes 300 according to one example implementation. As shown in FIG. 3A, the plurality of detected changes 300, which were detected by the change detector 105A, may include a first change 300A that modifies the field 305 of the record 301 with the record identifier ID2 in the database 103 to a first value 303A (e.g., JIM@DOMAIN.COM) and a second change 300B that modifies the field 305 to a second value 303B (e.g., JAMES@DOMAIN.COM). In this scenario, as shown in FIG. 3B, the change reducer 105B may determine that a reduced set of changes 307 are sufficient to demonstrate the current state of data in the database 103 to the external systems $111_{1-N}$. In particular, as shown in FIG. 3B, the change reducer 105B may determine that the plurality of detected changes 300 may be collapsed to the reduced set of changes 307 that demonstrates the current state of data in the database 103. In this scenario, the reduced set of changes 307 includes only a single change 307A that modifies the field 305 of the record 301 to the second value 303B. As shown in FIG. 3C, the reduced set of changes 307 may thereafter be used for generating messages 113 that are made available to the external systems 111. In this scenario, a single message 113B is generated by the message generator 105C. Although this message 113B is generated based solely on the change 307A, the message 113B reflects the current state of data in the database 103 based on the first change 300A and the second change 300B. This message 113B includes the identifier of the record 301 (i.e., ID2), the second value 303B, and the "modify" action that indicates that the record 301 with the identifier ID2 was modified to the second value 303B in the database 103. This message 113B may be used by one or more external systems $111_{1-N}$ for updating corresponding local databases $119_{1-N}$ and/or external system data $115_{1-N}$. Generating messages 113 using the reduced set of changes 307 produces a corresponding reduced set of messages 113 in comparison to using the plurality of detected changes 300 (e.g., one message 113 was generated instead of two messages 113).

Figure 4A:
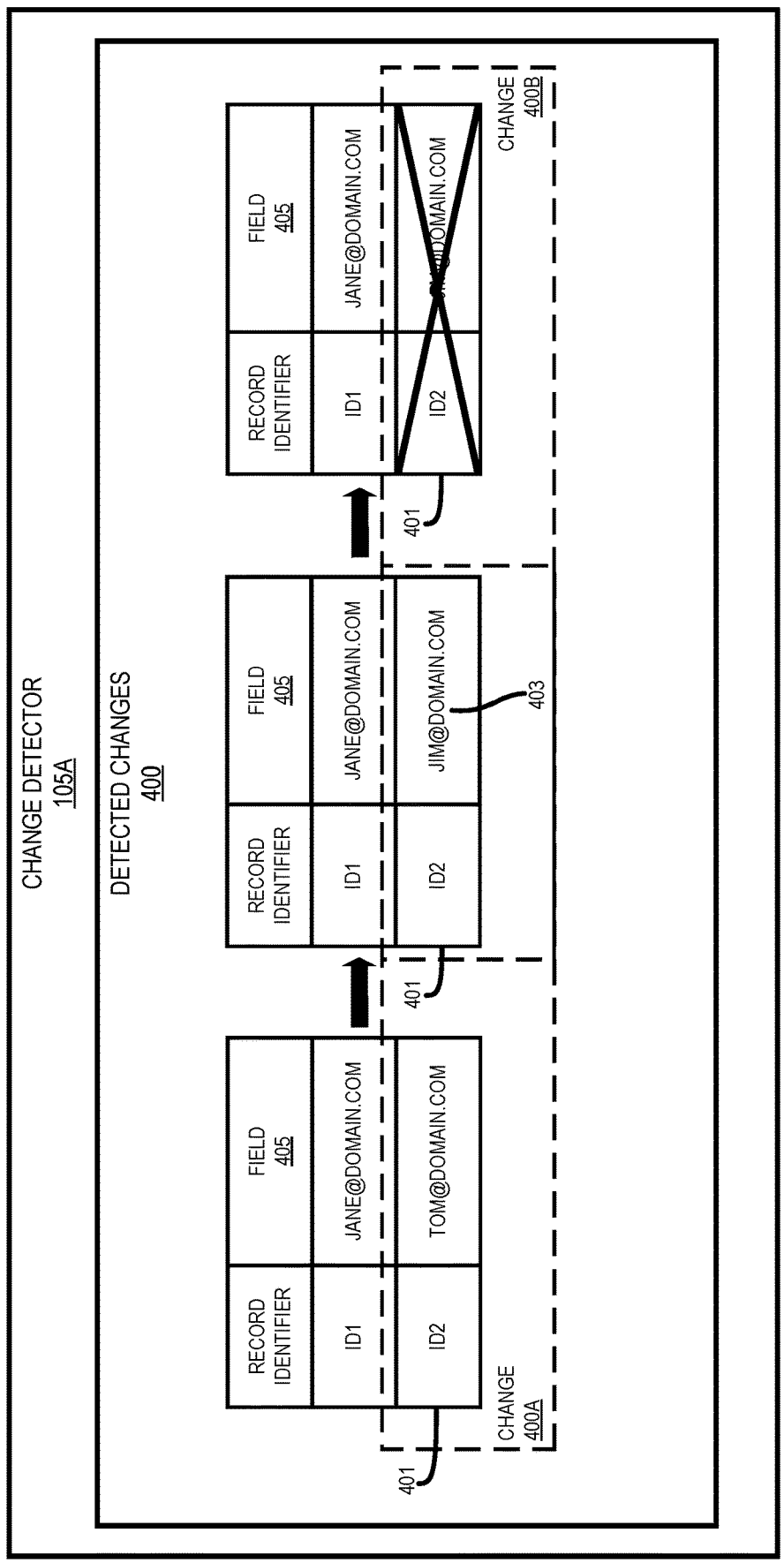
FIG. 4A shows a plurality of detected changes to a database according to one example implementation.
Figure 4B:
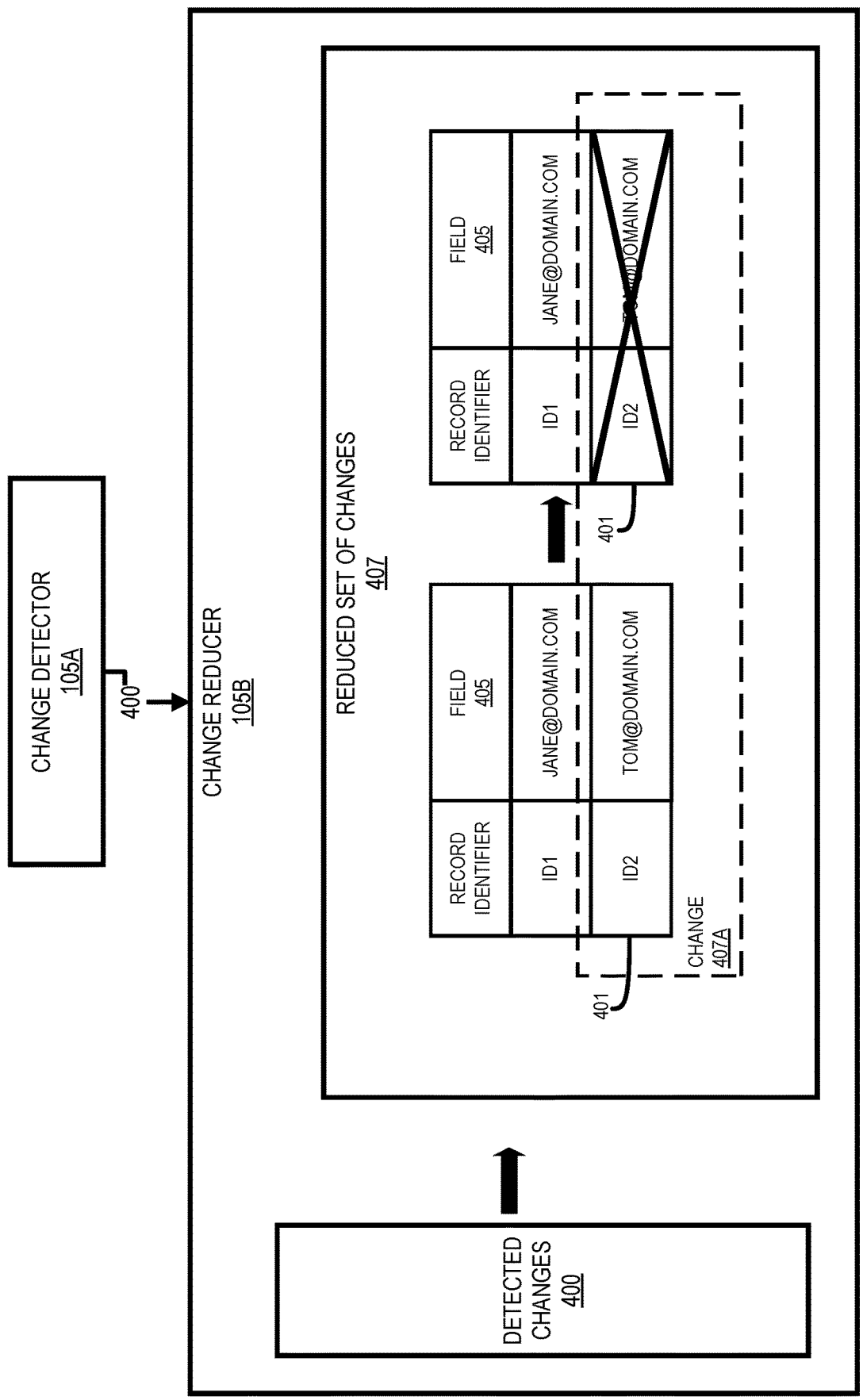
FIG. 4B shows a reduced set of changes based on the detected set of changes from FIG. 4A that demonstrate the current state of data in the database according to one example implementation.

FIGS. 4A-4C show still another scenario in which the change reducer 105B may determine that one or more changes of a plurality of detected changes is superfluous to demonstrating the current state of data in the database 103 to the external systems $111_{1-N}$. As shown in FIG. 4A, the plurality of detected changes 400, which were detected by the change detector 105A, may include a first change 400A that modifies the field 405 of the record 401 with the record identifier ID2 in the database 103 to a value 403 (e.g., JIM@DOMAIN.COM) and a second change 400B that deletes the record 401. In this scenario, as shown in FIG. 4B, the change reducer 105B may determine that a reduced set of changes 407 are sufficient to demonstrate the current state of data in the database 103 to the external systems $111_{1-N}$. In particular, as shown in FIG. 4B, the change reducer 105B may determine that the plurality of detected changes 400 may be collapsed to the reduced set of changes 407 that demonstrates the current state of data in the database 103. In this scenario, the reduced set of changes 407 includes only a single change 407A that deletes the record 401 from the database 103. As shown in FIG. 4C, the reduced set of changes 407 may thereafter be used for generating messages 113 that are made available to the external systems 111. In this scenario, a single message 113C is generated by the message generator 105C. Although this message 113C is generated based solely on the change 407A, the message 113C reflects the current state of data in the database 103 based on the first change 400A and the second change 400B. This message 113C includes the identifier of the record 401 (i.e., ID2) and the "delete" action that indicates that the record 401 with the identifier ID2 was deleted from the database 103. This message 113C may be used by one or more external systems $111_{1-N}$ for updating corresponding local databases $119_{1-N}$ and/or external system data $115_{1-N}$. Generating messages 113 using the reduced set of changes 407 produces a corresponding reduced set of messages 113 in comparison to using the plurality of detected changes 400 (e.g., one message 113 was generated instead of two messages 113).

Figure 5A:
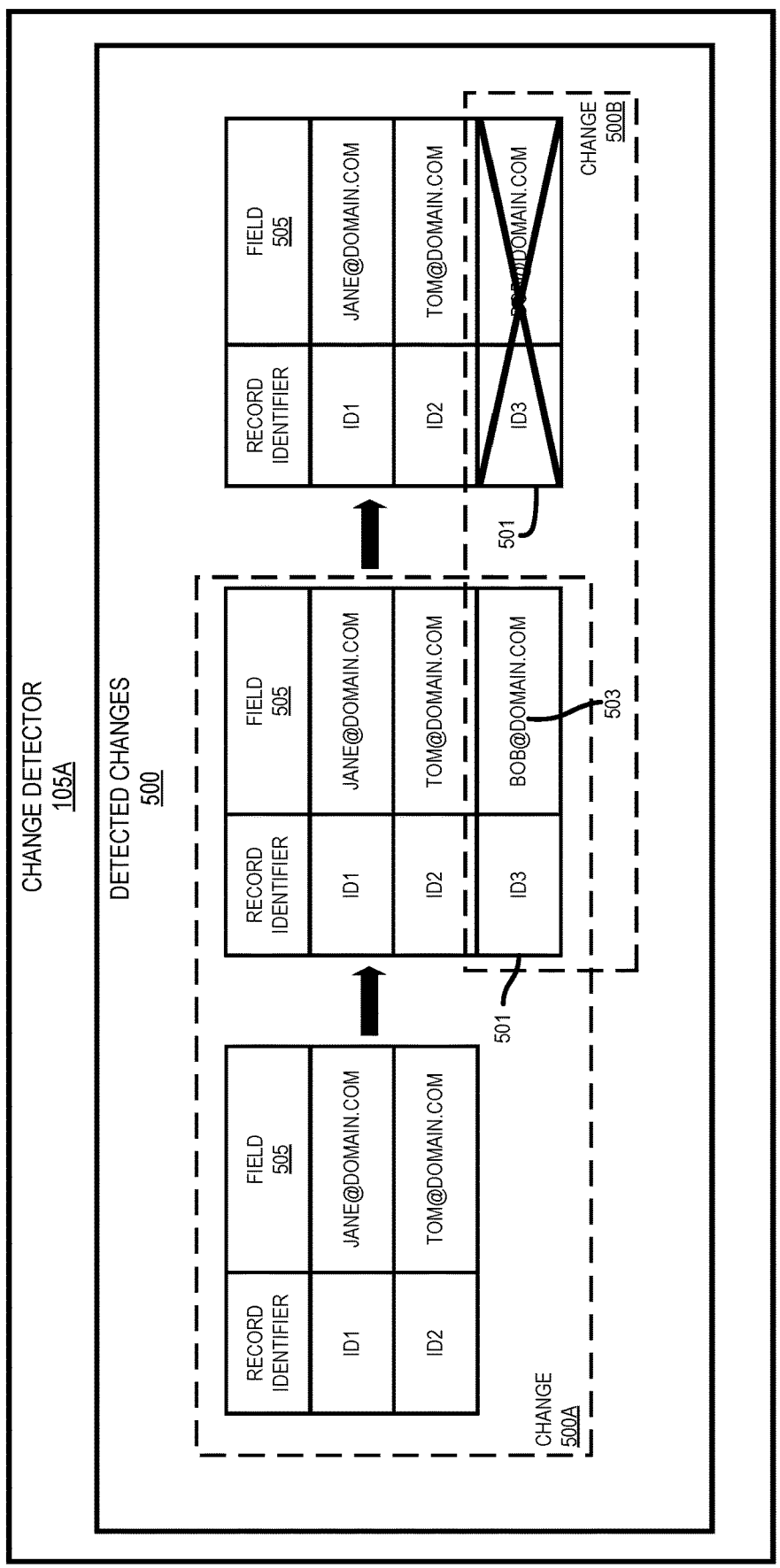
FIG. 5A shows a plurality of detected changes to a database according to one example implementation.
Figure 5B:
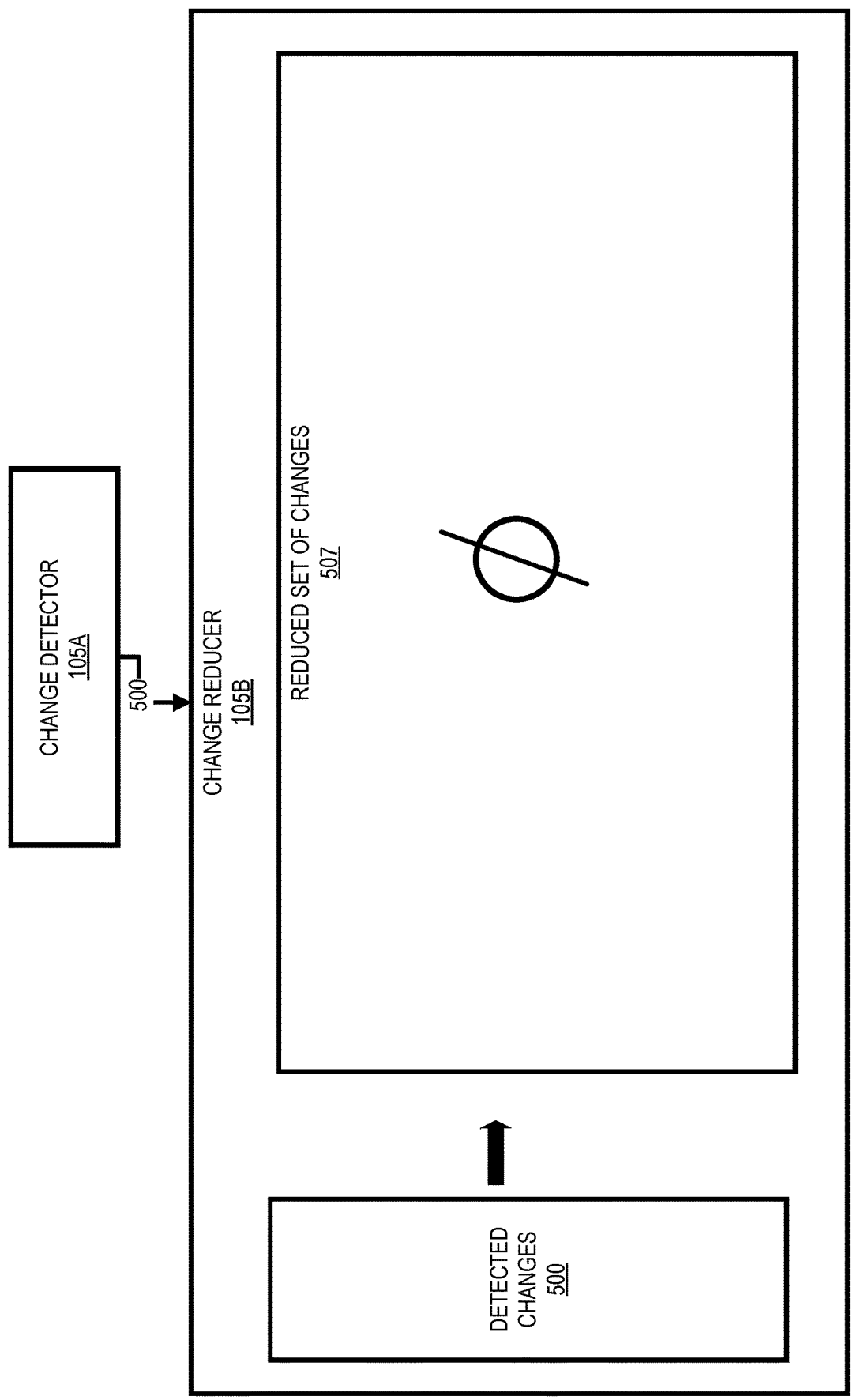
FIG. 5B shows a reduced set of changes based on the detected set of changes from FIG. 5A that demonstrate the current state of data in the database according to one example implementation.

FIGS. 5A-5C show yet another scenario in which the change reducer 105B may determine that one or more changes of a plurality of detected changes is superfluous to demonstrating the current state of data in the database 103 to the external systems $111_{1-N}$. As shown in FIG. 5A, the plurality of detected changes 500, which were detected by the change detector 105A, may include a first change 500A that creates the record 501 with the record identifier ID3 in the database 103 and a second change 500B that deletes the record 501. In this scenario, as shown in FIG. 5B, the change reducer 105B may determine that a reduced set of changes 507 are sufficient to demonstrate the current state of data in the database 103 to the external systems $111_{1-N}$. In particular, as shown in FIG. 5B, the change reducer 105B may determine that the plurality of detected changes 500 may be collapsed to the reduced set of changes 507 that demonstrates the current state of data in the database 103. In this scenario, the reduced set of changes 507 includes no changes. As shown in FIG. 5C, since the reduced set of changes 507 include no changes, the message generator 105C may generate no messages 113 to be made available to the external systems $111_{1-N}$. By using the reduced set of changes 507, the message generator 105C avoids generating unnecessary messages 113 for demonstrating the current state of data in the database 103 to the external systems $111_{1-N}$.

As shown above, the transaction observer 105 may collapse a plurality of detected changes into a reduced set of changes when the transaction observer 105 determines that one or more changes in the plurality of detected changes is superfluous to demonstrating a current state of data in the database 103 to the external systems $111_{1-N}$. The reduced set of changes may be used to generate zero or more messages 113 that are made available to the external systems $111_{1-N}$. Since the messages 113 are generated based on the reduced set of changes rather than the plurality of detected number of changes, the transaction observer 105 may generate a corresponding reduced set of messages 113 in comparison to when the messages 113 are generated based on the plurality of detected changes. This reduced set of changes results in reduced consumption of both network and processing resources as (1) fewer messages 113 need to be transmitted to the external systems $111_{1-N}$; (2) fewer messages 113 need to be processed by the external systems $111_{1-N}$ to update a corresponding local database $119_{1-N}$ and/or external system data $115_{1-N}$; and (3) fewer updates to external system data $115_{1-N}$ need to be transmitted back to the database 103.

Figure 6:
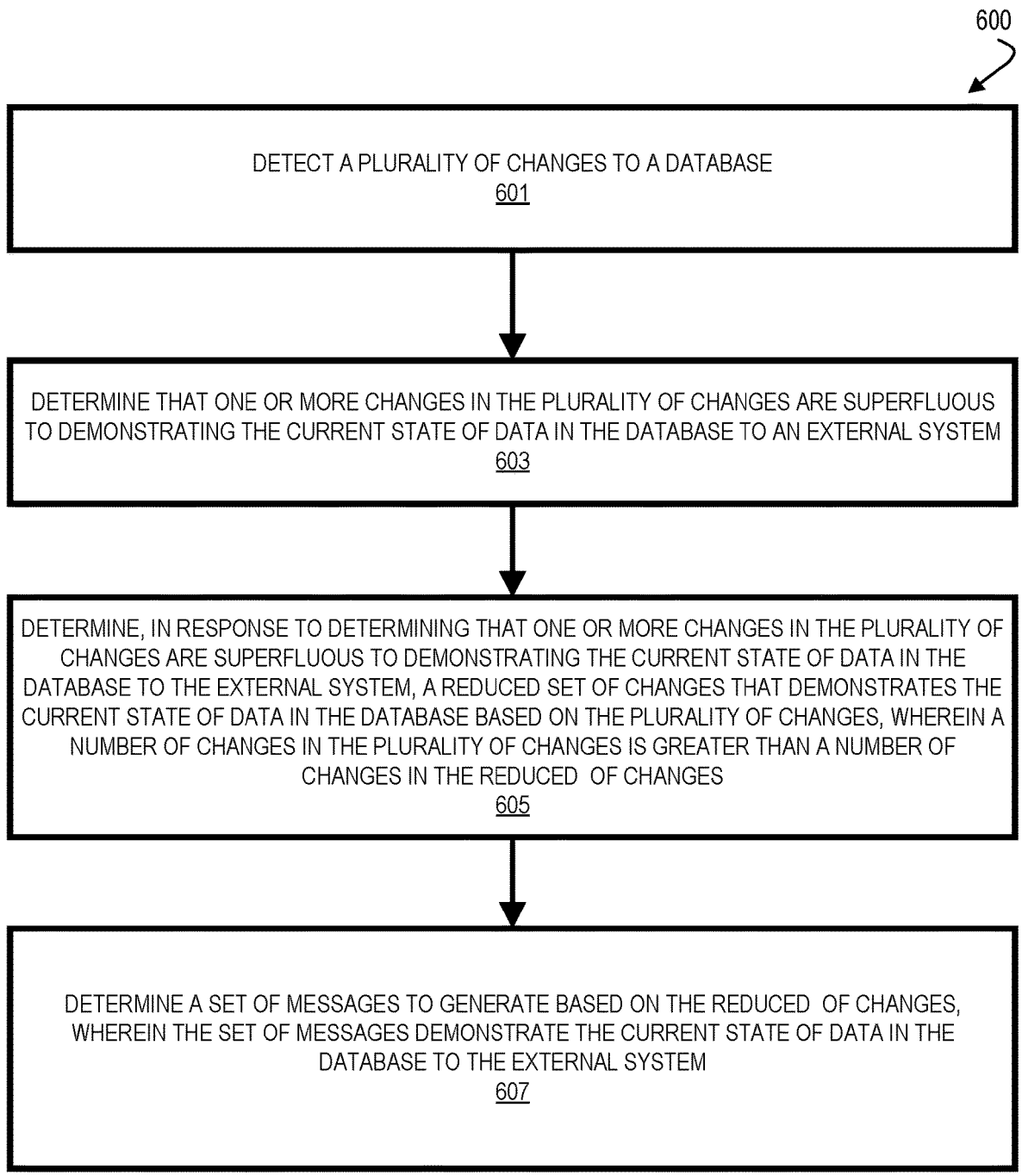
FIG. 6 shows a method for collapsing a plurality of detected changes to data in the database, into a reduced set of changes, wherein messages are generated for the reduced set of changes instead of the plurality of detected changes to demonstrate a current state of data in the database to an external system according to one example implementation.

Turning now to FIG. 6, a method 600 will be described for collapsing a plurality of detected changes to data in the database 103, into a reduced set of changes, wherein messages 113 are generated for the reduced set of changes instead of the plurality of detected changes to demonstrate a current state of data in the database 103 to an external system 111. The operations in the flow diagram of FIG. 6 will be described with reference to the exemplary implementations of the other figures. However, it should be understood that the operations of the flow diagram can be performed by implementations other than those discussed with reference to the other figures, and the implementations discussed with reference to these other figures can perform operations different than those discussed with reference to the flow diagrams.

Although described and shown in FIG. 6 in a particular order, the operations of the method 600 are not restricted to this order. For example, one or more of the operations of the method 600 may be performed in a different order or in partially or fully overlapping time periods. Accordingly, the description and depiction of the method 600 is for illustrative purposes and is not intended to restrict to a particular implementation.

The method 600 may commence at operation 601 with detection of a plurality of changes to the database 103 in a database management system 100. In one implementation, the database management system 100 may include a transaction observer 105 that monitors the database 103 and detects the changes at operation 601. For example, the transaction observer 105 may include a change detector 105A that monitors the database 103 to detect one or more of the creation of a record in the database 103, the deletion of a record from the database 103, and the modification of a field of a record in the database 103 (e.g., modification of a field value for a field of a record to a new value). In one implementation, the plurality of changes detected at operation 601 may be one or more of the detected changes 200 of FIG. 2A, the detected changes 300 of FIG. 3A, the detected changes 400 of FIG. 4A, and the detected changes 500 of FIG. 5A.

Following detection of the plurality of changes, a change reducer 105B of the transaction observer 105 may determine at operation 603 that one or more changes in the plurality of changes are superfluous to demonstrating the current state of data in the database 103 to an external system 111. For example, the change reducer 105B of the transaction observer 105 may determine that one or more of the changes in the plurality of changes are superfluous to demonstrating the current state of data in the database 103 to an external system 111 based on one or more of the scenarios described in FIGS. 2B, 3B, 4B, and 5B. However, in other implementations, additional scenarios may be used for determining that one or more of the change in the plurality of changes are superfluous to demonstrating the current state of data in the database 103 to an external system 111.

In response to determining that one or more changes in the plurality of changes are superfluous to demonstrating the current state of data in the database 103 to an external system 111, the change reducer 105B of the transaction observer 105 may determine a reduced set of changes at operation 605 that demonstrates the current state of data in the database based on the plurality of changes. The number of changes in the plurality of changes is greater than a number of changes in the reduced set of changes. For example, the change reducer 105B of the transaction observer 105 may determine a reduced set of changes based on one or more of the scenarios described in FIGS. 2B, 3B, 4B, and 5B.

At operation 607, the message generator 105C of the transaction observer 105 may determine a set of messages 113 to generate based on the reduced set of changes, wherein the set of messages 113 demonstrate the current state of data in the database 103 to an external system 111. In some implementations, a single message 113 is generated for each change in the reduced set of changes. For example, the message generator 105C of the transaction observer 105 may determine a set of messages 113 based on one or more of the scenarios describes in FIGS. 2C, 3C, 4C, and 5C. The set of messages 113 generated at operation 607 may thereafter be made available to the external system 111 via one or more of the enterprise messaging platform 107 and the streamers 109.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off (when power is removed), and the electronic device copies that part of the code that is to be executed by the processor(s) of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code to be executed into volatile memory, the code/data may be provided directly to the processor(s) (e.g., loaded into a cache of the processor(s)); in other words, this non-volatile memory operates as both long term storage and main memory, and thus the electronic device may have no or only a small amount of DRAM for main memory. In addition to machine-readable storage media, typical electronic devices can transmit code and/or data over a machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 7A:
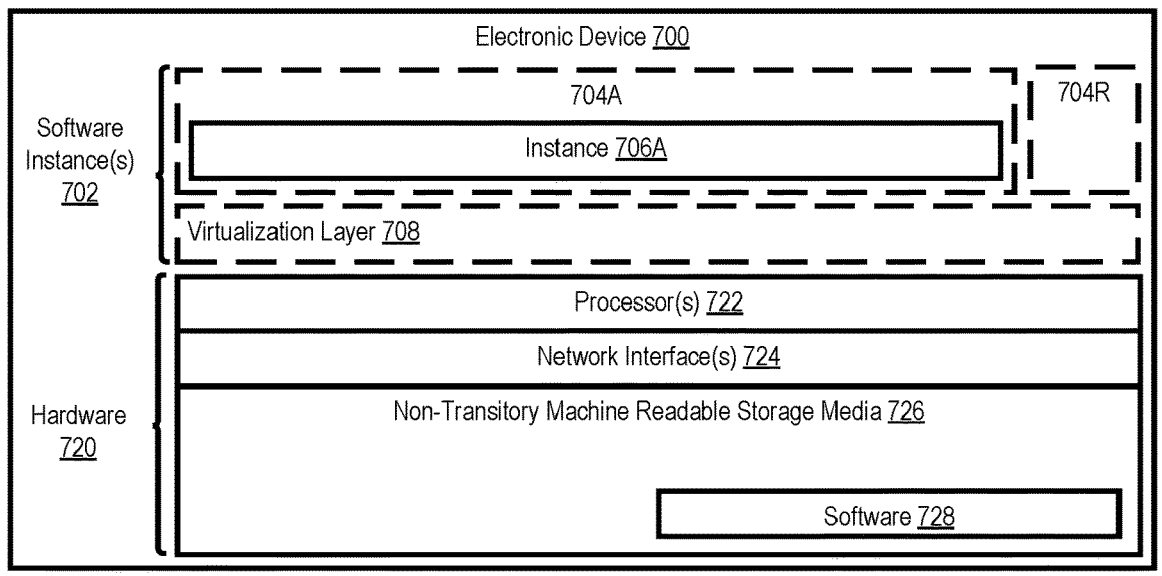
FIG. 7A illustrates an electronic device according to one example implementation.

FIG. 7A is a block diagram illustrating an electronic device according to some example implementations. FIG. 7A includes hardware 720 comprising a set of one or more processor(s) 722, a set of one or more network interfaces 724 (wireless and/or wired), and non-transitory machine-readable storage media 726 having stored therein software 728 (which includes instructions executable by the set of one or more processor(s) 722). Each of the previously described external systems 111 and the transaction observer 105 service may be implemented in one or more electronic devices 700. In one implementation: 1) each of the external systems 111 is implemented in a separate one of the electronic devices 700 (e.g., in a user electronic device operated by a user, the software 728 includes the software to implement one of the external systems 111, including software to interface with the transaction observer 105 (e.g., a web browser, a native client, a portal, a command-line interface, and/or an application program interface (API) based upon protocols such as Simple Object Access Protocol (SOAP), Representational State Transfer (REST), etc.)); 2) the transaction observer 105 service is implemented in a separate set of one or more of the electronic devices 700 (in which case, the software 728 is the software to implement the transaction observer 105 service and it is executed by the set of one or more server electronic devices); and 3) in operation, the user electronic devices and the electronic device(s) implementing the transaction observer 105 service would be communicatively coupled (e.g., by a network) and would establish between them (or through one or more other layers) connections for submitting messages 113 to the external systems 111 and returning external services data 115 to the database 103. Other configurations of electronic devices may be used in other implementations (e.g., an implementation in which the end user client and the transaction observer 105 service are implemented on a single electronic device).

In electronic devices that use compute virtualization, the processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7B:
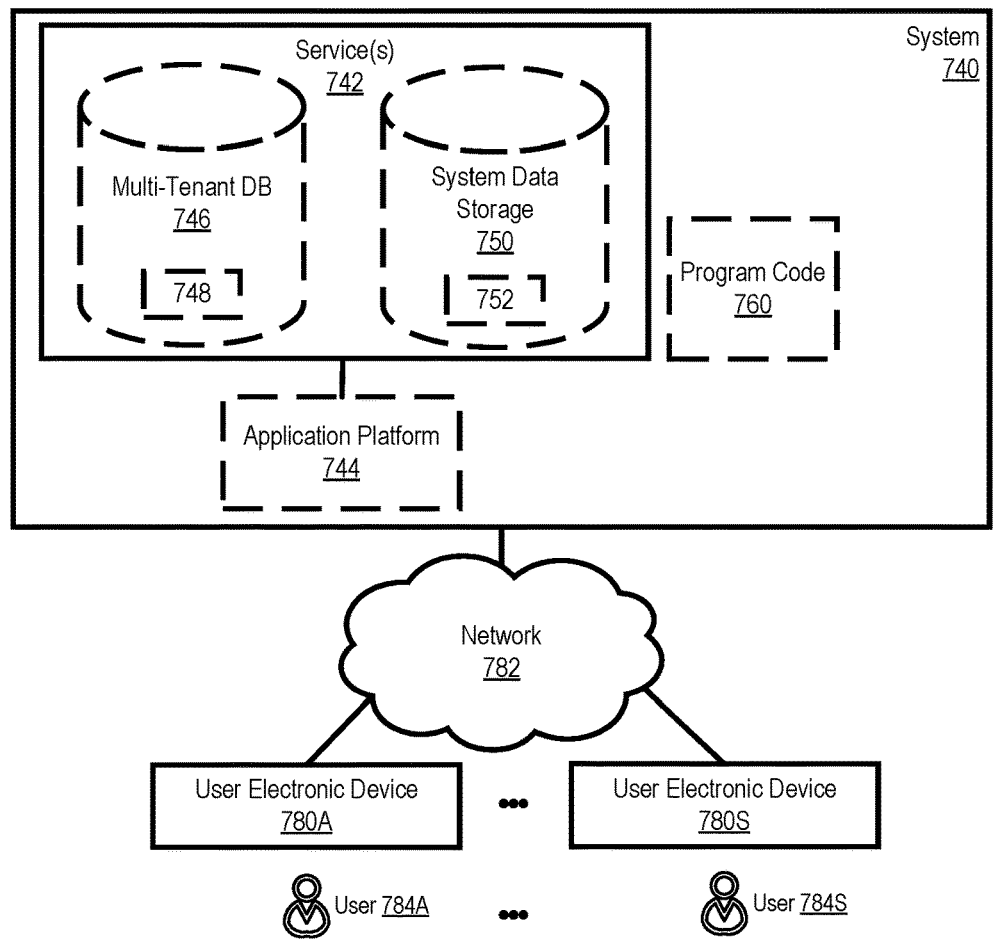
FIG. 7B shows a block diagram of an environment where an on-demand customer relationship management system may be implemented according to one example implementation.

FIG. 7B is a block diagram of an environment where a database management system 100 may be deployed, according to some implementations. A system 740 includes hardware (a set of one or more electronic devices) and software to provide service(s) 742, including the transaction observer 105 service. The system 740 is coupled to user electronic devices 780A-S over a network 782. The service(s) 742 may be on-demand services that are made available to users working for one or more other organizations (sometimes referred to as outside users) so that those organizations do not need to necessarily be concerned with building and/or maintaining a system, but instead makes use of the service(s) 742 when needed (e.g., on the demand of the users). The service(s) 742 may communicate with each other and/or with one or more of the user electronic devices 780A-S via one or more Application Programming Interface(s) (APIs) (e.g., a Representational State Transfer (REST) API). The user electronic devices 780A-S are operated by users 784A-S.

In one implementation, the system 740 is a multi-tenant cloud computing architecture supporting multiple services, such as a transaction observer 105 service, a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 740 may include an application platform 744 that enables PAAS for creating, managing, and executing one or more applications developed by the provider of the application platform 744, users accessing the system 740 via one or more of user electronic devices 780A-S, or third-party application developers accessing the system 740 via one or more of user electronic devices 780A-S.

In some implementations, one or more of the service(s) 742 may utilize one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user electronic device 780A-S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the one or more multi-tenant database 746 and/or system data storage 750.

In some implementations, the service(s) 742 are implemented using virtual applications dynamically created at run time responsive to queries from the user electronic devices 780A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the transaction observer 105 service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 740 and the user electronic devices 780A-S.

Each user electronic device 780A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 740. For example, the user interface device can be used to access data and applications hosted by system 740, and to perform searches on stored data, and otherwise allow a user 784 to interact with various GUI pages that may be presented to a user. User electronic devices 780A-S might communicate with system 740 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 780A-S might include an HTTP client, commonly referred to as a "browser", for sending and receiving HTTP messages to and from server(s) at system 740, thus allowing users 784 of the user electronic device 780A-S to access, process and view information, pages and applications available to it from system 740 over network 782.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the exemplary implementations may include an on-demand database service environment provided by an application server with a front end for an on-demand database service capable of supporting multiple tenants, alternative implementations are within the spirit and scope of the appended claims (e.g., other database architectures may be used, such as ORACLE® or DB2® by IBM).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for collapsing a plurality of detected changes to data in a database into a reduced set of changes, wherein messages are generated for the reduced set of changes instead of the plurality of detected changes to demonstrate a current state of data in the database to a first external system, the method comprising:
   detecting a plurality of changes to the database, wherein the plurality of changes corresponds to records and fields designated for monitoring in the database;
   determining that one or more changes in the plurality of changes are superfluous to demonstrating the current state of data in the database to the first external system;
   determining, by a transaction observer of a database management system and in response to determining that one or more changes in the plurality of changes are superfluous to demonstrating the current state of data in the database to the first external system, a reduced set of changes that demonstrates the current state of data in the database based on the plurality of changes, wherein a number of changes in the plurality of changes is greater than a number of changes in the reduced set of changes, wherein the plurality of changes are part of a single database transaction, wherein all changes within the single database transaction are committed together to the database;
   determining a set of messages to generate based on the reduced set of changes, wherein the set of messages demonstrate the current state of data in the database to the first external system and each message in the set of messages includes (1) an identifier of a record in the database and (2) an action in relation to the identified record in the database;
   receiving, by a database management system of the database from the first external system, external data reflecting the current state of data in the database, wherein the external data is to be updated and received by the database management system after receipt of the set of messages; and
   storing, by the database management system, the external data with associated records in the database.

2. The method of claim 1, wherein determining the reduced set of changes that demonstrates the current state of data in the database based on the plurality of changes comprises:
   determining that a first change in the plurality of changes creates a record in the database with a first value for a field of the record and that a second change in the plurality of changes modifies the field of the record to a second value; and
   determining to include a single change in the reduced set of changes to reflect the first change and the second change, wherein the single change creates the record in the database with the second value for the field,
   wherein the set of messages includes a single message reflecting the first change and the second change.

3. The method of claim 1, wherein determining the reduced set of changes that demonstrates the current state of data in the database based on the plurality of changes comprises:
   determining that a first change in the plurality of changes modifies a field of a record in the database to a first value and a second change in the plurality of changes modifies the field for the record in the database to a second value; and
   determining to include a single change in the reduced set of changes to reflect the first change and the second change, wherein the single change is the second change,
   wherein the set of messages includes a single message reflecting the first change and the second change.

4. The method of claim 1, wherein determining the reduced set of changes that demonstrates the current state of data in the database based on the plurality of changes comprises:
   determining that a first change in the plurality of changes creates the record in the database and a second change in the plurality of changes deletes the record in the database; and
   determining to include no changes in the reduced set of changes to reflect the first change and the second change,
   wherein the set of messages includes no messages reflecting either the first change or the second change.

5. The method of claim 1, wherein determining the reduced set of changes that demonstrates the current state of data in the database based on the plurality of changes comprises:
   determining that a first change in the plurality of changes modifies a field of a record in the database and a second change in the plurality of changes deletes the record in the database; and
   determining to include a single change in the reduced set of changes to reflect the first change and the second change, wherein the single change is the second change,
   wherein the set of messages includes a single message collectively reflecting the first change and the second change.

6. A database management system for collapsing a plurality of detected changes to data in a database into a reduced set of changes, wherein messages are generated for the reduced set of changes instead of the plurality of detected changes to demonstrate a current state of data in the database to an external system, the database management system comprising:
   a change detector of a transaction observer to detect a plurality of changes to the database, wherein the plurality of changes corresponds to records and fields designated for monitoring in the database;
   a change reducer of the database management system to determine that one or more changes in the plurality of changes are superfluous to demonstrating the current state of data in the database to the external system and determine, in response to determining that one or more changes in the plurality of changes are superfluous to demonstrating the current state of data in the database to the external system, a reduced set of changes that demonstrates the current state of data in the database based on the plurality of changes, wherein a number of changes in the plurality of changes is greater than a number of changes in the reduced set of changes, wherein the plurality of changes are part of a single database transaction, wherein all changes within the single database transaction are committed together to the database; and a message generator to determine a set of messages to generate based on the reduced set of changes, wherein the set of messages demonstrate the current state of data in the database to the external system and each message in the set of messages includes (1) an identifier of a record in the database and (2) an action in relation to the identified record in the database, wherein the database management system is to receive from the first external system, external data reflecting the current state of data in the database, wherein the external data is to be updated and received by the database management system after receipt of the set of messages, and wherein the database management system is to store the external data with associated records in the database.

7. The database management system of claim 6, wherein determining, by the change reducer, the reduced set of changes that demonstrates the current state of data in the database based on the plurality of changes comprises:

determining that a first change in the plurality of changes creates a record in the database with a first value for a field of the record and that a second change in the plurality of changes modifies the field of the record to a second value; and determining to include a single change in the reduced set of changes to reflect the first change and the second change, wherein the single change creates the record in the database with the second value for the field, wherein the set of messages includes a single message reflecting the first change and the second change.

8. The database management system of claim 6, wherein determining, by the change reducer, the reduced set of changes that demonstrates the current state of data in the database based on the plurality of changes comprises:

determining that a first change in the plurality of changes modifies a field of a record in the database to a first value and a second change in the plurality of changes modifies the field for the record in the database to a second value; and determining to include a single change in the reduced set of changes to reflect the first change and the second change, wherein the single change is the second change, wherein the set of messages includes a single message reflecting the first change and the second change.

9. The database management system of claim 6, wherein determining, by the change reducer, the reduced set of changes that demonstrates the current state of data in the database based on the plurality of changes comprises:

determining that a first change in the plurality of changes creates the record in the database and a second change in the plurality of changes deletes the record in the database; and determining to include no changes in the reduced set of changes to reflect the first change and the second change, wherein the set of messages includes no messages reflecting either the first change or the second change.

10. The database management system of claim 6, wherein determining, by the change reducer, the reduced set of changes that demonstrates the current state of data in the database based on the plurality of changes comprises:

determining that a first change in the plurality of changes modifies a field of a record in the database and a second change in the plurality of changes deletes the record in the database; and determining to include a single change in the reduced set of changes to reflect the first change and the second change, wherein the single change is the second change, wherein the set of messages includes a single message collectively reflecting the first change and the second change.

11. A non-transitory machine-readable medium for collapsing a plurality of detected changes to data in a database into a reduced set of changes, wherein messages are generated for the reduced set of changes instead of the plurality of detected changes to demonstrate a current state of data in the database to an external system, wherein the non-transitory machine-readable medium stores instructions that when executed by a processor of an electronic device, cause the electronic device to:

detect a plurality of changes to the database, wherein the plurality of changes corresponds to records and fields designated for monitoring in the database;

determine that one or more changes in the plurality of changes are superfluous to demonstrating the current state of data in the database to the external system;

determine, in response to determining that one or more changes in the plurality of changes are superfluous to demonstrating the current state of data in the database to the external system, a reduced set of changes that demonstrates the current state of data in the database based on the plurality of changes, wherein a number of changes in the plurality of changes is greater than a number of changes in the reduced set of changes, wherein the plurality of changes are part of a single database transaction, wherein all changes within the single database transaction are committed together to the database; and determine a set of messages to generate based on the reduced set of changes, wherein the set of messages demonstrate the current state of data in the database to the external system and each message in the set of messages includes (1) an identifier of a record in the database and (2) an action in relation to the identified record in the database;

receive, from the first external system, external data reflecting the current state of data in the database, wherein the external data is to be updated and received by the database management system after receipt of the set of messages; and store the external data with associated records in the database.

12. The non-transitory machine-readable medium of claim 11, wherein determining the reduced set of changes that demonstrates the current state of data in the database based on the plurality of changes comprises:

determining that a first change in the plurality of changes creates a record in the database with a first value for a field of the record and that a second change in the plurality of changes modifies the field of the record to a second value; and determining to include a single change in the reduced set of changes to reflect the first change and the second change, wherein the single change creates the record in the database with the second value for the field, wherein the set of messages includes a single message reflecting the first change and the second change.

13. The non-transitory machine-readable medium of claim 11, wherein determining the reduced set of changes that demonstrates the current state of data in the database based on the plurality of changes comprises:

determining that a first change in the plurality of changes modifies a field of a record in the database to a first value and a second change in the plurality of changes modifies the field for the record in the database to a second value; and determining to include a single change in the reduced set of changes to reflect the first change and the second change, wherein the single change is the second change, wherein the set of messages includes a single message reflecting the first change and the second change.

14. The non-transitory machine-readable medium of claim 11, wherein determining the reduced set of changes that demonstrates the current state of data in the database based on the plurality of changes comprises:

determining that a first change in the plurality of changes creates the record in the database and a second change in the plurality of changes deletes the record in the database; and determining to include no changes in the reduced set of changes to reflect the first change and the second change, wherein the set of messages includes no messages reflecting either the first change or the second change.

15. The non-transitory machine-readable medium of claim 11, wherein determining the reduced set of changes that demonstrates the current state of data in the database based on the plurality of changes comprises:

determining that a first change in the plurality of changes modifies a field of a record in the database and a second change in the plurality of changes deletes the record in the database; and determining to include a single change in the reduced set of changes to reflect the first change and the second change, wherein the single change is the second change, wherein the set of messages includes a single message collectively reflecting the first change and the second change.

16. The method of claim 1, further comprising:

broadcasting, by the database management system, the set of messages to the first external system via a first streamer associated with the first external system and to a second external system via a second streamer associated with the second external system, wherein the first streamer is to (1) receive the set of messages from the database management system, (2) convert the set of messages to a first format of the first external system, and (3) push the set messages in the first format to the first external system, and wherein the second streamer is to (1) receive the set of messages from the database management system, (2) convert the set of messages to a second format of the second external system, and (3) push the set messages in the second format to the second external system.

* * * * *